Figure 1:
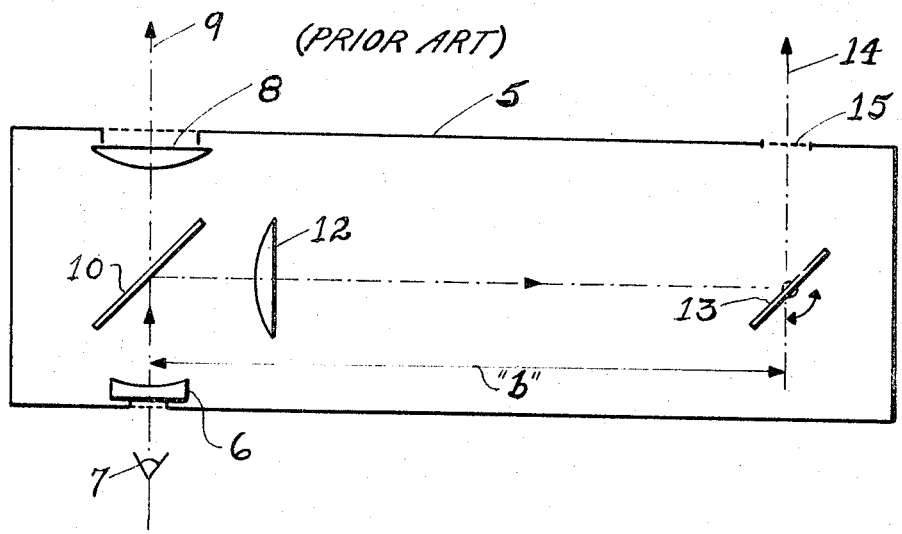

July 18, 1967  H. A. FROEHLICH  3,331,300
CAMERA RANGEFINDER
Filed Oct. 8, 1965

INVENTOR
HENRY A. FROEHLICH

BY
ATTORNEY 3,331,300
CAMERA RANGEFINDER
Henry A. Froehlich, Larchmont, N.Y., assignor, by mesne assignments, to Berkey Photo, Inc., New York, N.Y., a corporation of Delaware
Filed Oct. 8, 1965, Ser. No. 494,191
4 Claims. (Cl. 95—44)

The present invention relates to camera rangefinders and more particularly to a rangefinder having increased contrast without sacrifice of sensitivity.

At the present time most popular type cameras employ rangefinders of the non-symmetrical type wherein sets of equal magnification lenses are employed which in effect forms gallileo telescopes and a beam splitter is interposed so that each beam is visible through a common lens to the eye of the photographer. However, the distance of an object to the beam splitter differs through one lens from that of the other so that the photographer observes superimposed different size images of the same object. For very short object distances of from two to five feet this phenomenon of unequal size images becomes particularly drastic and since the size of the image varies with object distance full coincidence of both images can only be obtained if the area of the smallest image is decreased almost to a spot.

In order to increase the visibility of such superimposed spot image it has been heretofore recognized in the art that the light intensity of such spot image must be increased over the surrounding large underlying image or the contrast therebetween must be increased. Since it is difficult to increase the intensity of the spot without further decreasing its size to ineffectiveness present camera rangefinders resort to a beam splitter wherein its light transmission is lower than its reflection in order to accentuate the spot. Unfortunately, however, this has not been a solution to the problem because decreasing transmission darkens the overall intensity of the image beam used for composing the resulting photograph which has given rise to many complaints from camera owners.

It is accordingly the primary object of the present invention to provide a camera rangefinder wherein the contrast of the spot image is considerably increased without decreasing the outer surrounding area of the image beam used for composing the ensuing photograph.

Another object of the present invention is the provision of a camera rangefinder wherein the contrast of the image beam used for composing the ensuing photograph is varied by decreasing transmission of a limited area thereof which coincides with the image of the spot beam as seen by the eye of the photographer.

The foregoing objects together with still further objects which will become apparent to those skilled in the art as the following description proceeds are achieved in accordance with the present invention by the utilization of a beam splitter preferably of the multiple layer interference type having equal transmission and reflection characteristics, or by the use mirrors of the interference type whereby the light transmitted may be of one color such as blue while the reflected light is of the complementary color, namely, yellow. Also the contrast of the spot beam is increased by dimming only a limited area of the image composing beam through imposition of a small density filter disposed at an appropriate location somewhere in the path of such composing beam.

Figure 2:
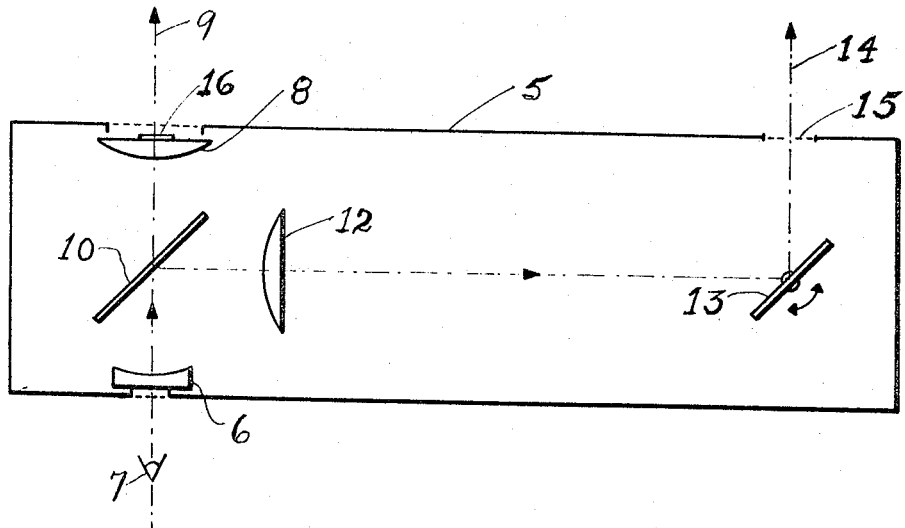

The present invention may be more fully appreciated by reference to the accompanying drawing wherein:

FIGURE 1 is a schematic illustration of the present customary type camera rangefinder, and FIGURE 2 is a schematic illustration of the camera rangefinder illustrated in FIG. 1 to which the present invention has been added thereto.

Referring now to the drawings in detail the camera casing 5 is provided in its rear wall with a viewing lens 6 normally positioned adjacent the eye 7 of the photographer while he adjusts the photographic lens (not shown) for the appropriate distance between the camera and the object to be photographed, as is well known in the art. The front wall of the camera case 5 is provided with a lens 8 shown in coaxial alignment with the rear viewing lens 6, which together form a gallileo telescope in the usual manner. Angularly disposed in the path of the image composing beam 9 is a beam splitter 10 which transmits this image composing beam 9 from the entrance lens 8 to the viewing lens 6.

An additional lens 12 is axially disposed within the camera case 5 normal to the path of the image composing beam 9 and also in angular alignment with the beam splitter 10 which lens 12 likewise forms a gallileo telescope with the viewing lens 6. A rotatably mounted mirror 13 has its axis normally aligned relative to that of the interior lens 12 and rotation of such mirror is controlled by the focusing movement of the photographic lens (not shown) in such manner that whenever the image of this photographic lens is at its sharpest on the film plane, a spot image beam 14 entering the smal front opening 15 in the camera case 5 is reflected by the mirror 13 and the beam splitter 10 so as to coincide with the image focusing beam 9 visible through the viewing lens 6. Although the magnification ratio of the two telescopes comprising the lenses 6 and 8 as well as 6 and 12 are equal their sensitivity is further determined by the base distance $b$ and since the opening 15 is but a small fraction of the area of that of the entrance lens 8 the reflected beam 14 amounts to but a small spot compared with the area of the image composing beam 9 and hence is superimposed on the latter.

This phenomenon of unequal size superimposed images is particularly disadvantgeous for short distances and is greatly emphasized at object to film distances of from two to five feet. Hence it is too frequently very difficult to distinguish the superimposed spot beam 14 from the surrounding area of the image composing beam 9. In order to emphasize the distinction between these beams it is desirable to either increase the light intensity of the spot over the surrounding image, or to increase the contrast in favor of the spot. Efforts have been made to rectify this condition by utilizing a beam splitter 10 wherein its light transmission is lower than its reflection so that the intensity of the spot is accentuated over the surrounding image area. This, however, has proven to be far from a solution to the problem because it only results in a darkening of the image produced by the beam 9, and since this latter beam is used by the photographer for composing the image itself, it becomes exceedingly difficult which has given rise to numerous complaints.

These objections are eliminated by the present invention without employing a beam splitter 10 other than one having substantially equal transmission and reflection properties, and in all other respects the rangefinder differs very little from that of the prior art as hereinbefore described, which may also include a mirror 10 of the interference type utilizing blue transmitted light to produce complementary yellow reflected light. However, the contrast of the spot beam 14 is increased by the present invention through the provision of a small neutral density filter 16 disposed somewhere in the path of the image beam 9. Such filter 16 is just slightly larger in area than that of the spot beam 14 and may be conveniently applied to the surface of the lens 8 as shown in FIG. 2.

This filter spot 16 can be produced, for example, by masking the lens 8 and evaporating silver in a vacuum chamber to deposit a silver spot of preselected diameter until the desired density of light transmission is obtained.

The provision of this filter of desired density consequently does not lower the overall brightness of the viewing or composing field, as viewed by the eye 7 of the photographer, but only this area of the overlapping two images as produced by the spot beam 14 superimposed on the image focusing beam 9. The actual density of the silver spot 16 was found to be very effective in the range of .15 to .20 thereby decreasing only the area of the image producing beam 9 on which the spot beam 14 is superimposed and resulting in much clearer rangefinding perception for the photographer.

It should thus become obvious to those skilled in the art that a camera rangefinder has been provided by the present invention wherein the contrast of the spot image is increased considerably without decreasing the outer surrounding area of the image beam viewed by the photographer when composing the ensuing photograph. By utilization of a density filter at an appropriate position in the image producing beam the intensity of the latter is reduced within a limited area coinciding substantially with the area of the spot beam which thereby effectively accentuates the latter and makes it more readily observable to the photographer during focusing of the camera shutter.

Although one embodiment of the present invention has been herein shown and described it is to be understood that still further modifications thereof may be made without departing from the spirit and scope of the appended claims.

I claim:
1. A camera rangefinder comprising:
   (a) a lens system including an entrance lens and a viewing lens for producing an image composing beam observable to the eye of a photographer through said viewing lens,
   (b) a second lens system including a pivoted mirror as well as the viewing lens of said first mentioned lens system for producing a spot image beam also observable to the eye of the photographer,
   (c) a beam splitter interposed in the path of both of said beams and operable to transmit said image composing beam and for reflecting said spot image beam into axial coincidence with said image composing beam so that said spot image beam is observed superimposed on a limited area of the latter when seen on said viewing lens, and
   (d) a small neutral density filter disposed in the path of said image composing beam for decreasing the incident transmitted light intensity over an area only slightly greater than that of the superimposed spot image beam to increase the contrast between the latter and the surrounding image composing beam.

2. A camera rangefinder as set forth in claim 1 wherein the small neutral filter comprises a coating applied to a preselected area of one of the lens of the image composing beam system.

3. A camera rangefinder as set forth in claim 1 wherein the small neutral density filter comprises a layer of material applied to a limited area of the entrance lens and having a density in the range of .15 to .20.

4. A camera rangefinder as set forth in claim 1 wherein the small neutral density filter comprises a layer of vacuum-deposited evaporated silver upon a limited area of the entrance lens.

References Cited
UNITED STATES PATENTS

| | | | |
|---|---|---|---|
| 2,127,925 | 8/1938 | Leitz | 95—44 |
| 2,317,810 | 4/1943 | Sauen | 95—44 |

JOHN M. HORAN, *Primary Examiner.*